July 26, 1932. J. A. ROEMISCH 1,869,280
CONTROLLABLE PITCH PROPELLER
Filed June 16, 1931 2 Sheets-Sheet 2
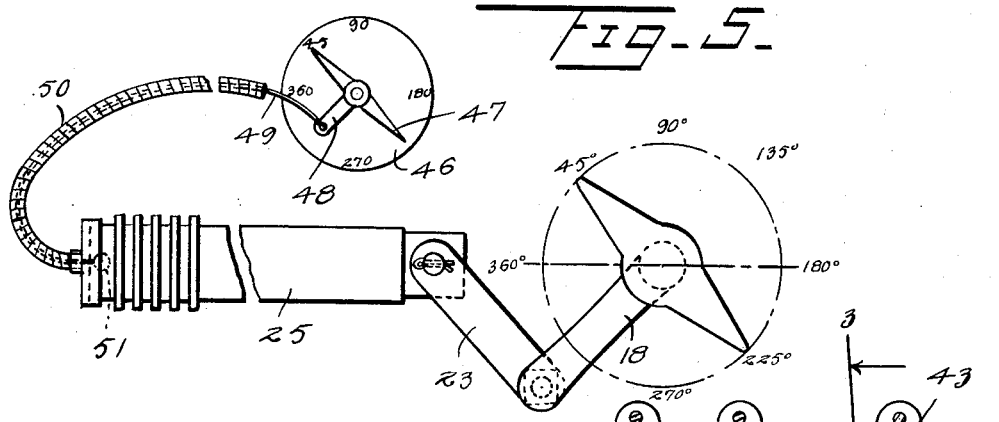
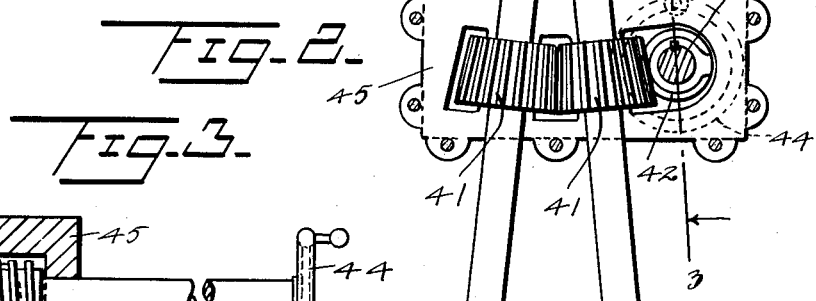
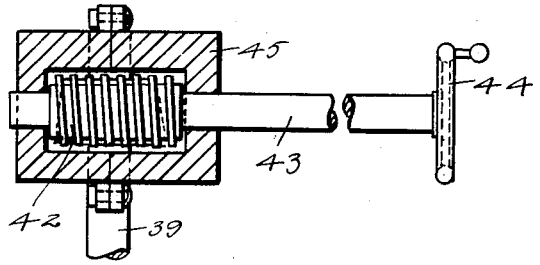
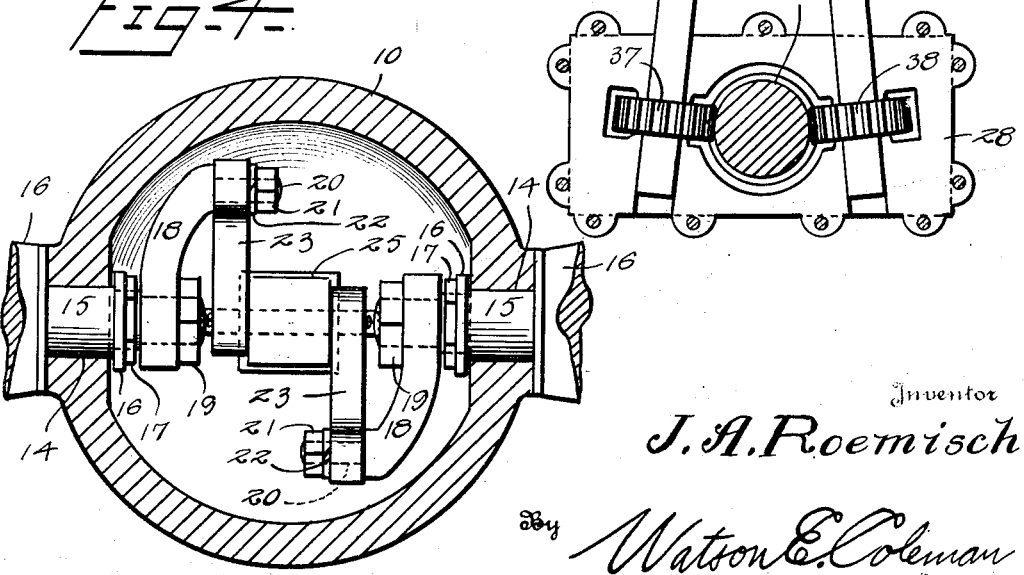
Inventor
J. A. Roemisch
By Watson E. Coleman
Attorney Patented July 26, 1932

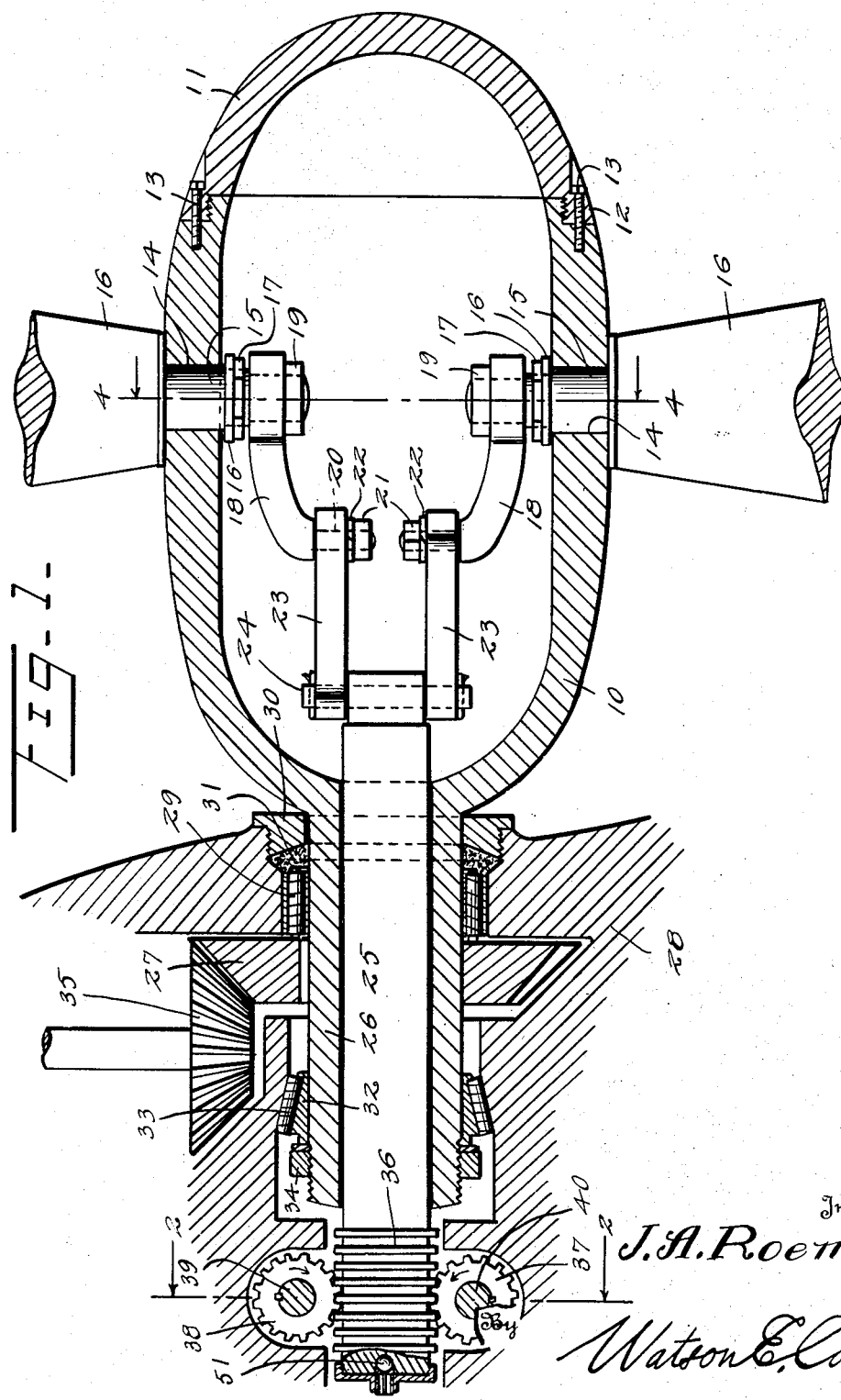

1,869,280

UNITED STATES PATENT OFFICE

JOSEPH A. ROEMISCH, OF SEGUIN, TEXAS

CONTROLLABLE PITCH PROPELLER

Application filed June 16, 1931. Serial No. 544,811.

This invention relates to propellers and particularly to propellers for motor boats, outboard motors or the like, though I do not wish to be limited to this use of the propeller, and particularly to means whereby the pitch of the propeller blades may be changed to any desired degree while the propeller is running to thus increase or decrease the speed of the boat or reverse the action of the propeller.

A further object is to provide a structure of this character which is very simple and which is particularly adapted, though not necessarily limited, to outboard motors.

A further object is to provide means whereby the operator may see the extent to which he has changed the pitch of the propeller, this means being in the form of an indicator.

Other objects will appear in the course of the following description.

My invention is illustrated in the accompanying drawings, wherein:—

Figure 1 is a longitudinal section through my changeable pitch propeller and a portion of the body upon which the propeller is mounted;

Figure 2 is a section on the line 2—2 of Figure 1;

Figure 3 is a section on the line 3—3 of Figure 2;

Figure 4 is a section on the line 4—4 of Figure 1;

Figure 5 is a diagrammatic elevation showing the pitch indicating means.

Referring to these drawings, 10 designates a housing which preferably has a stream line form and constitutes the hollow hub of the propeller. This housing is continued at one end and closed at this end by means of a detachable cap 11 held in place by being screwed upon the body 10 at 12 and by set screws or like devices 13 which will prevent the cap 11 from becoming unscrewed.

The cap 11 is formed at diametrically opposite points with the bearings designated generally 14 in which the shafts or shanks 15 of the propeller blades 16 are oscillatably supported. These bearings 14 may be of any suitable character. I have illustrated the shafts or shanks 15 of the blades as being reduced in diameter just inward of the bearing and as being engaged by a lock nut 16 and a nut 17. The inner ends of the shanks 15 may be squared or many-sided to receive and fit the apertures in the arms 18. These arms are held in place upon the shanks 15 by means of the nuts 19. The arms 18 are curved inward and at their ends are formed with angularly disposed wrist pins 20 carrying the nuts 21 and the washers 22. Connected to these wrist pins are the links 23. These arms 18 extend in transversely opposite directions as shown in Figure 4.

The links 23 extend rearward and are pivotally connected by a pivot pin 24 to an operating rod 25 which extends centrally through a tubular extension 26 of the housing or hub 10. Mounted upon this tubular extension is a propeller driving gear 27 which may be of any suitable character. The tubular extension 26 is mounted in suitable bearings in a housing 28. I have illustrated roller bearings 29 carried by the housing 28 just in advance of the driving gear wheel 27. I have also illustrated a packing nut 30 engaging the housing and packing 31 disposed inward of the packing nut, this packing nut and packing acting to prevent the entrance of water into the housing. This construction is purely illustrative and I do not wish to be limited to any particular form of bearing or packing.

Inward of the gear wheel 27, there is provided the tapered bearing ring 32 and a thrust roller bearing 33 with the lock nut 34 to hold the bearing 32 in place and tighten it up from time to time. Any suitable gearing may be used for engaging the drive gear 27. This drive gear 27 may be a beveled gear wheel or any other suitable gear wheel and connected up with the motor in any suitable manner. I have illustrated for this purpose, however, a beveled gear wheel 35 engaging the driving gear wheel 27, this beveled gear wheel 35 having a vertical shaft extending upward to the motor of the "outboard motor."

For the purpose of shifting the controlling rod 25 in one direction or the other to control the pitch of the blades 16, I provided this rod 25 with the circular gear teeth 36 and dispose on each side of the rod and within the housing 29 the gear wheels 37 and 38 which engage these gear teeth 36.

Inasmuch as the gear teeth 36 are circular, it is obvious that the rod 25 may rotate with the rotation of the tubular propeller shaft 26 without in any way being impeded by the gear wheels 37 and 38, but that when these gear wheels 37 and 38 are rotated in the direction of the arrows in Figure 1, the rod 25 will be shifted rearward, but when the gear wheels are rotated in the reverse direction, the rod will be shifted forward.

These gear wheels 37 and 38 are mounted upon the two upwardly converging shafts 39 and 40 (see Figure 2). These shafts preferably upwardly converge, as before stated, though I do not wish to be limited to this and at their upper ends, they are provided with beveled pinions 41 which intermesh with each other and one of which is engaged by the worm 42 mounted upon a shaft 43. As the worm 40 is rotated by the handle 44 in one direction or the other, the shafts 39 and 40 will be rotated to thus shift the rod 25 forward or rearward and thus change the pitch of the propeller. Of course, it will be understood that the gear wheels 37 and 38 will be disposed within the housing 28. The gears 41 with the worm 42 will be disposed within the housing 45. These housings will be sectional housings so that the housings may be taken apart to permit access to the gear wheels. The gear wheels may be run in oil if desired or be otherwise lubricated.

For the purpose of indicating the extent to which the blades of the propeller have been shifted, I provide preferably an indicator designated generally 46 having a dial marked with degrees and operating over this dial is a pivoted pointer 47 having an arm 48, this arm being connected by a Bowden wire to the longitudinally shiftable rod 25.

The Bowden wire, of course, as usual consists of a flexible wire 49 encased in an outer flexible covering 50. This is connected by a ball joint 51 to the rod 25. The pointer 47 is disposed at the same inclination as one of the blades and under these circumstances it will be obvous that as the blade is shifted by shifting the rod 25, so will the pointer be shifted. This Bowden wire is properly supported throughout its length.

It will be obvious from what has gone before that the blades of the propeller may be shifted so that the plane of the blades will be at right angles to the axis of rotation, in which position the blades will be absolutely neutral or that the blades may be shifted into any desired angular relation to the axis of rotation to thus drive the craft forward at any desired speed or secure a reversal of movement of the craft.

It will be seen that my mechanism for this purpose is very simple, compact and that by reason of its simplicity and compactness, it is particularly adapted to outboard motors. However, I do not wish to be limited to this as it may be applied to built in motors. Neither do I wish to be limited to this applied to boats as it might be applied to aircraft or in any other situation where changeable pitch blades are required.

I claim:—

1. A propeller having a hollow hub, blades extending radially therefrom and having shanks extending radially into the hub and axially rotatable therein, a tubular shaft carrying the hub, a longitudinally movable controlling member mounted within the tubular shaft, crank arms on the shanks of the blades, links connecting the crank arms to the controlling member, and means for operating the controlling member including a series of circular gear teeth extending around the controlling member, opposed gear wheels engaging the said teeth, shafts upon which the gear wheels are mounted, and a single manually operable means having engagement with said shafts whereby they may be rotated in opposite directions.

2. A propeller having a hollow hub, blades extending radially therefrom and having shanks extending radially into the hub and axially rotatable therein, a tubular shaft carrying the hub, a longitudinally movable controlling member mounted within the tubular shaft, crank arms on the shanks of the blades, links connecting the crank arms to the controlling member, and means for operating the controlling member including a series of circular gear teeth extending around the controlling members, opposed gear wheels engaging the said teeth, shafts upon which the gear wheels are mounted, intermeshing gear wheels on said shafts, and a single manually operable means engaging one of said gear wheels to cause simultaneous rotary movement of both of said gear wheels.

3. A propeller having a hollow hub, blades having shafts extending radially into the hub and axially rotatable therein, each of said shafts having a crank arm within the hollow hub, a tubular shaft on which the hub is mounted, means for rotating said shaft, a longitudinally shiftable controlling rod mounted within the tubular shaft and extending into the hub, links connecting one end of the shaft to the crank arms, a series of gear teeth on the controlling member, the gear teeth extending circumferentially around the controlling member, oppositely disposed gear wheels engaging said gear teeth, upwardly converging shafts upon which the gear wheels are mounted, and manually controllable means operative to cause simultaneous rotation of the shafts in opposite directions.

4. In a propeller mechanism, a hollow propeller hub having a tubular shaft, a gear wheel mounted upon the shaft, a vertical drive shaft having a gear wheel thereon operatively engaging the gear wheel on the propeller shaft, propeller blades having radial shanks extending into the hub and rotatably mounted therein, each of said shanks having a crank arm, a longitudinally movable controlling rod mounted within the tubular shaft and having linked connection to said arms, said shaft having a series of circular gear teeth extending circumferentially around the shaft, opposed gear wheels engaging said gear teeth, upwardly extending shafts upon which the gear wheels are mounted and carrying gear wheels at their upper ends, and a horizontally extending shaft having a worm operatively engaging the gear wheels of the upwardly converging shafts and having a handle whereby it may be rotated.

In testimony whereof I hereunto affix my signature.

JOSEPH A. ROEMISCH.